May 3, 1966   M. L. PETERSON   3,248,935
HAIRSPRING WIRE BENDING STRENGTH GAUGE
Filed Nov. 6, 1962   2 Sheets-Sheet 2

INVENTOR.
MILES L. PETERSON
BY
Le Blanc and Shur
ATTORNEYS

United States Patent Office 3,248,935
Patented May 3, 1966

3,248,935
HAIRSPRING WIRE BENDING STRENGTH GAUGE
Miles L. Peterson, Lancaster, Pa., assignor to Hamilton Watch Company, Lancaster, Pa., a corporation of Pennsylvania
Filed Nov. 6, 1962, Ser. No. 235,782
12 Claims. (Cl. 73—100)

This invention relates to a method and apparatus for making qualitative and relative measurements of the stiffness of flexible bodies and is more particularly related to a method and apparatus for measuring the stiffness or bending-strength of highly flexible wire such as, for example, the type utilized in forming hairsprings for timepieces.

The need has existed for some time for a measuring apparatus capable of accurately, yet speedily, determining the stiffness or bending-strength of extremely small and relatively fragile strands or strips of material. In no field has this need for a measuring system been felt more acutely than in the field relating to the forming and testing of hairsprings used in high precision timepieces of the wrist watch type. In the manufacture and fabrication of these highly precision and often extremely compact wrist watches, it is highly desirable if not an absolute necessity that the stiffness or bending-strength of the material used in forming the hairspring be determined with a high degree of accuracy.

As is well known in the time keeping field, even a slight variation of only plus or minus 4% in the strength of a material from which a hairspring is fabricated will cause a variation of plus or minus 18 minutes per day in the assembled watch. This relatively wide variation of over 36 minutes per day that may occur between the timekeeping qualities of various watches requires that the manufacturer provide some regulating means in each watch for adjusting the accuracy of the timepiece. Not only does this addition of a regulating device in the watch add to its cost, but the fact that each watch must be regulated prior to its leaving the factory also increases the ultimate cost of the finished product. Thus, it becomes readily apparent that the exact bending-strength of each "lot" of wire used for forming hairsprings for watches must be closely measured and controlled if watches of the high precision and compact size are to be manufactured which do not require regulating devices or excessive factory adjustments.

Presently existing apparatus for determining the strength of various materials are generally unable to handle relatively thin and quite fragile materials such as the above-mentioned hairspring wire since they are designed to test less fragile and flexible bodies. Thus, it is extremely difficult or even impossible in most cases to make an accurate determination of the relatively low value of bending-strength possessed by hairsprings using these conventional measuring apparatuses. Even in those cases where such tests can be performed, most of these apparatuses are relatively slow to operate so that considerable time is required for a determination of the stiffness or strength of a body to be tested. In fact, so poor are the measuring qualities and speed of these prior known measuring apparatuses that the strength or bending properties of various "lots" of wire used in forming hairsprings for watches is presently measured by first ascertaining the specific dimensions of the wire and then utilizing these measurements to calculate the strength of the wire lot. Even though the ascertaining of these specific dimensions of a wire involves certain slow and laborious steps it is considerably faster and more accurate than using any prior known measuring instrument.

According to the present invention it has now been found that a testing apparatus may be constructed which overcomes these above-mentioned difficulties by providing a clamping and cutting device for accurately forming each test specimen. After each test specimen is accurately cut to a selected length the specimen is permitted to hang free in a "cantilever" fashion where its exact amount of bending, due to gravity acting on its free end, is measured by a measuring device. The test specimen is then rotated a predetermined amount and a second reading taken to compensate for any set or deformation that may be present in the specimen.

It is, therefore, a primary object of this invention to provide a testing apparatus for determining the strength of extremely small and flexible materials.

Another object of this invention is to provide a relatively simple apparatus by the use of which accurate determination of the stiffness of highly flexible bodies can be obtained simply and quickly.

Yet another object of this invention is to provide a testing apparatus which utilizes a minimum number of moving parts for testing the strength of various fragile bodies.

Yet still another object of this invention is to provide a testing apparatus which requires no critical balance, spring or torsion bar arrangement for its proper operation.

Yet another object of this invention is to provide a testing instrument fabricated from parts that are interchangeable for permitting repair or replacement without rendering the instrument inoperative or requiring extensive adjustment.

A further object of this invention is to provide a testing apparatus that will test a wide variety of fragile bodies having different dimensions.

Yet a further object of this invention is to provide a device for holding test specimens of extremely small dimensions and a fragile nature in place prior to their being subjected to a strength test.

Yet a still further object of this invention is to provide a testing apparatus having a device for accurately and quickly cutting the test specimen to a proper length for testing.

An other object of this invention is to provide a testing apparatus provided with a revolving or rotating clamp device for rotating the test specimen druing a test thereby compensating for any deformation that may have occurred in the specimen due to its handling or storage.

Yet another object of this invention is to provide a testing apparatus that requires only a minimum amount of technical skill for proper operation.

Yet still another object of this invention is to provide a testing apparatus which is rugged in construction and portable for movement from one point of operation to another without adjustments being required.

A further object of this invention is to provide a testing instrument for accurately and speedily determining the bending-strength of materials used in fabricating hairsprings.

Yet a further object of this invention is to provide a testing instrument having the above enumerated desirable characteristics yet which is inexpensive to produce, operate and maintain.

These and further objects and advantages of this invention will become more apparent upon further reference to the specification, claims, and appended drawings wherein:

FIGURE 3 is a cross-sectional view taken along the line 3—3 of FIGURE 2.

Figure 1:
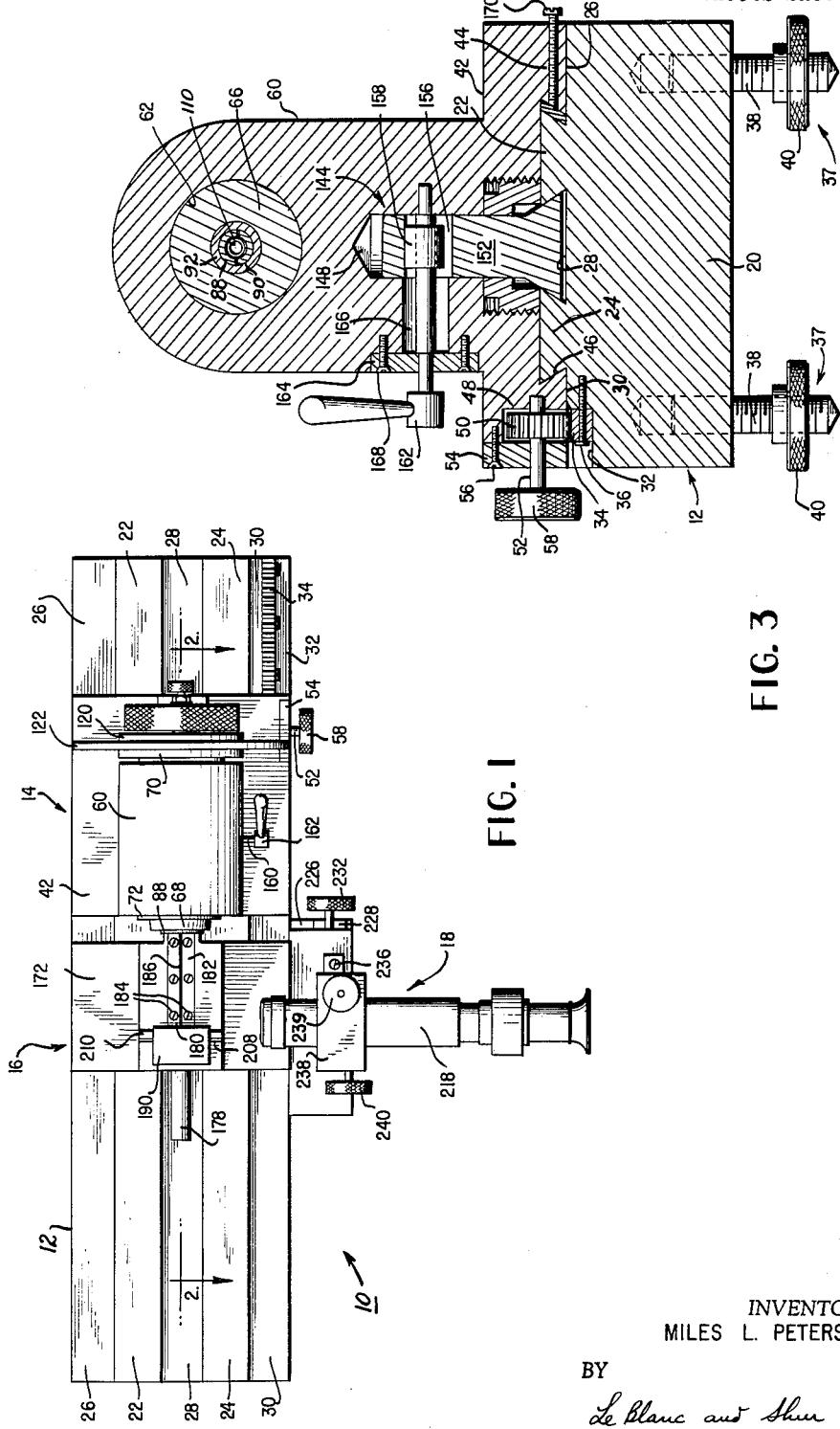
FIGURE 1 is a top view of a measuring or testing apparatus constructed in accordance with the present invention.

With continued reference to the accompanying drawing wherein like reference numerals designate similar parts throughout the various views, and with initial attention directed to the embodiment of the invention as shown in FIGURE 1, reference numeral 10 is used to generally designate a testing instrument constructed in accordance with the concepts of the present invention. The testing instrument of this invention comprises, in general, a base 12, a clamping and rotating assembly 14, a holding and cutting assembly 16, and a measuring assembly 18.

The base or mounting surface 12 comprises a metal base bar 20 on the top surface of which is machined a pair of dove-tailed ridges 22 and 24 and their corresponding channels 26 and 30 as seen in FIGURES 1 and 3. An elongated notch or channel 32 is formed in the top, left-hand side of the bar 20 for receiving a gear track or rack 34 which is secured therein by screws 36 as seen in FIGURE 3. Four levelling legs 37 consisting of a threaded shaft 38 and a knurled adjusting wheel 40 are threadably mounted on the bottom corners of the bar 20 thus permitting the bar to be placed in a perfectly level and stable condition in a well known manner.

The clamping and rotating assembly 14 comprises a metal base 42 having flanged edges 44 and 46 on its lower surface which match and slidably engage with the dovetail ridges 22 and 24. A recess 48 is machined or otherwise formed in the left-hand side of the base 42 for receiving a gear wheel or pinion 50 rotatably mounted on a shaft 52. A plate 54 having an aperture formed therein through which the shaft 52 extends is secured by metal screws 54 over the front of the recess 48 as seen in FIGURE 3. A knurled knob or operating wheel 58 is secured to the outer end of the shaft 52 for rotating the gear wheel 50.

The gear wheel 50 and gear track 34 are meshed together to form a rack and pinion arrangement so that rotation of the knob 58 will result in the wheel 50 driving the base 42 along the bar 20. The mating dove-tail arrangement between the ridges 22 and 24 and the flanged edges 44 and 46 serve to keep the base 42 on "track" and from slipping off the bar 20 in a well known manner.

Figure 2:
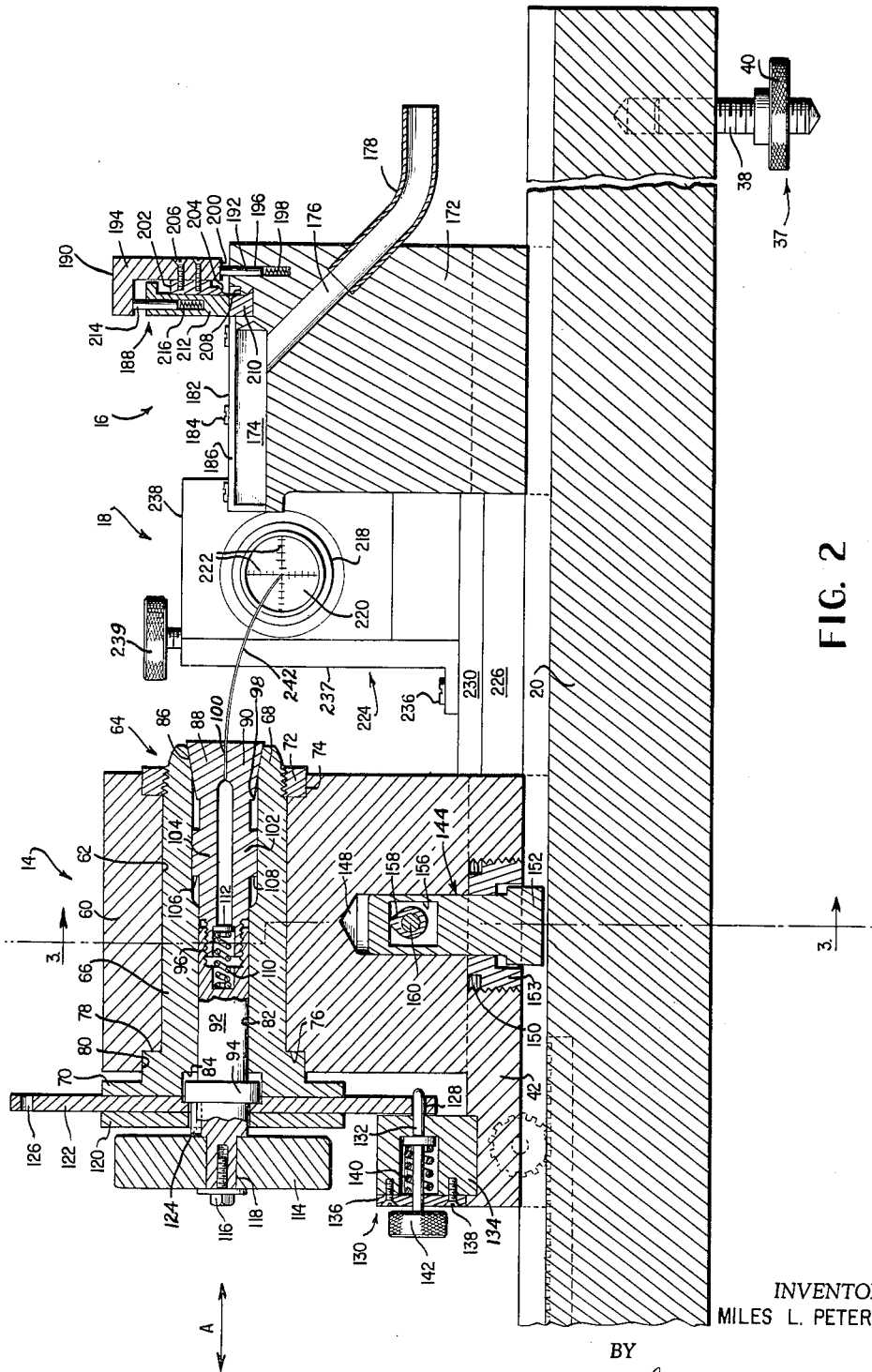
FIGURE 2 is a cross-sectional view on a larger scale taken along the line 2—2 of FIGURE 1.

A pedestal 60 is formed as an integral part of the base 42 and extends at a right angle therefrom. An aperture 62 is formed through the upper end of the pedestal for receiving a rotatable vise or clamping arrangement 64 as seen in FIGURE 2. This rotatable vise arrangement comprises a tubular outer casing 66 having a tapered and threaded end 68 and a flanged end 70. A threaded ring 72 is press-fitted into a recess 74 in the pedestal 60 for receiving and holding the threaded end 68 of the casing 66 within the aperture 62. To assure the proper positioning of the tubular casing within the aperture, the casing 66 is provided with a lip 76 which abuts against the wall 78 of a counterbore 80 in the aperture 62. The hollow center 82 of the tubular casing 66 is counterbored at 84 on its left-hand end and at 86 on its right-hand end for receiving a pair of jaws 88 and 90.

An operating shaft 92 having a flange 94 located in the counterbore 84 is positioned in the other end of the hollow center 82. The abutting ends of the jaws 88 and 90 and the shaft 92 are threadably connected together at 96 so that a push or pull on the shaft will cause the jaws to move laterally into or out of the counterbore 86, depending upon the direction of the force applied as indicated by the arrow A. Since the outer periphery of the jaws are tapered at 98, movement of the jaws 88 and 90 over the tapered end 86 into the counterbore of the tubular collar 66 will cause the inner surfaces 100 of the jaws to come together thus gripping any object located therebetween. Conversely, a forward push or movement of the shaft will result in the jaws 88 and 90 moving out of the counterbore 86 thereby permitting the jaws which are supported by outwardly biased spring sections 102 and 104, respectively, to gradually spread apart. As seen in FIGURE 2 each spring section 102 and 104 is provided with a tapered slide section 106 and 108, respectively, and is spring biased away from the shaft 92 by a coil spring 110 and washer 112.

To facilitate in moving the shaft 92 within the hollow center 82, a knurled knob 114 is secured by a screw 116 to the turned down end 118 of the shaft. A spacer washer 120 and a locking washer 122 are keyed over the shaft 92 by a key 124 formed on the shaft. A pair of apertures 126 and 128 are formed near the periphery and 180° apart in the locking washer 122 for reasons that will be more fully explained hereinafter.

A locking pin arrangement 130 for preventing the locking washer 122 from rotating is suitably mounted on the bar 20 and is comprised of a slide pin 132 housed within a hollow housing 134. A removable front plate 136 is secured over the open front of the housing 134 by a set of screws 138 and serves as a backing or pressure plate for one end of a coil spring 140 utilized to bias the slide pin to the right. An operating knob 142 of the knurled type is secured to the left-hand end of the pin 132 for permitting the pin to be pulled to the left against the pressure of the spring 140 thereby removing the right-hand end of the pin from the aperture 128 (in the present case) in the locking washer 122.

To lock the clamping and rotating assembly 14 in place on the bar 20 so that it cannot move laterally along the bar 20 during the operation of the measuring instrument, a locking arrangement 144 is provided within the base 42 and pedestal 60 as seen in FIGURES 2 and 3. This locking arrangement comprises a hollow bore 148 and counterbore 150 located through the bottom of the base 42 and into the pedestal 60. Located within the bore 148 is a sliding lock bolt 152 which has its lower end flared out at 154 to fit within the channel 26 as seen in FIGURE 3 and is held within the bore 148 by a threaded collar 153 which fits within the lower end of the counterbore 150. A hollow cavity 156 is formed in the bolt 152 near its top for receiving an eliptical or "tear drop" shaped cam surface cam surface 158 mounted on one end of a rotatable shaft 160 while an operating handle 162 is secured to the protruding end of the shaft.

As will be readily apparent, the rotation of the shaft 160 in a first direction by means of the handle 162 will result in the cam 158 bearing against the top of the cavity 156 thereby lifting the locking bolt 152. As the locking bolt is lifted, its flared out end 152 will engage against and firmly grip the inside surfaces of the dove-tailed channel 28 thereby securely locking the complete clamping and rotating assembly 14 against movement over the bar 20. When it is desirable to again move the assembly 14, the shaft 160 is rotated in the opposite direction a sufficient distance to move the cam 158 out of engagement with the top and into engagement with the bottom of the cavity 156. This results in the locking bolt 152 being driven downward since some room for such movement is present between the lower end of the locking bolt and the bottom of the channel 28, thereby releasing the flared out end 152 from its clamping engagement with the walls of the channel 28.

A screw 170 is threaded through the flanged edge 44 of the base 42 for engaging the wall of the ridge 22 whenever it is desirable to permanently lock the clamping and rotating assembly 14 against any movement along the bar 20 as sometimes is the case.

The cutting and holding assembly 16 comprises a sliding mounting block 172 having dove-tailed edges (not shown) on its lower surface or bottom which are substantially the same as those of the base 42 and which slidably engage with the dove-tailed ridges 22 and 24. The cutting and holding assembly 16 can also be locked against any movement along the bar 20 by a conventional locking means (not shown). The top surface of the mounting block 172 is provided with a lateral channel or groove 174 which extends from the front edge of the block to substantially its rear or trailing edge. A bore or tubular passage 176 is bored at an upward angle from substantially the center of the rear face of the block 172 into the channel 174 as seen in FIGURE 2. An extension 178 is secured in an air tight manner to the end of the passage 176 as by threading it into the block 172 for connecting the passage and thus the channel 174 to a suitable vacuum pumping system for reasons that will be more apparent later.

A pair of L shaped plates 180 and 182 are mounted, one on either side of the top surface of the channel 174, by screws or bolts 184 as seen in FIGURE 1. The edges of the "long legs" of the L shaped plates 180 and 182 are spaced a slight distance apart thereby forming a passage 186 from the outer surface of the plates to the channel 174 while the open end of the channel is sealed by the edges of the "short legs" of the plates abutting in an air tight manner against one another. Thus, it is seen that the only passage between the atmosphere and the vacuum passage 176 is through the exeremely thin, elongated passage 186 formed between the edges of the plates 180 and 182.

Also mounted on the top surface of the mounting block 172 is a cutting device 188 comprising a substantially L shaped supporting arm 190 which is held in an upright position by a slidable pin 192 that is formed as an integral part of the leg 194 and is mounted in an aperture 196 formed in the top of the block. A small coil spring 198 is positioned in the aperture 196 for biasing the lower end 200 of the leg 194 in an upward direction so that it is normally spaced slightly above the surface of the mounting block 172 for reasons that will be more apparent later.

A cutting block 202 having a cutting edge 204 formed thereon is secured to the inner surface of the leg 194 by a pair of screws 206 as seen in FIGURE 2. A groove 208 is formed in the mounting block 172 immediately under the cutting edge 204 and a shear block 210 is placed into a portion thereof for forming a perfectly matched mating surface with the edge of the cutter 204. A portion of the groove 208 is left open to receive and hold that part of a test specimen that is trimmed off. A clamping block 212 is slidably mounted on the leg 214 of the supporting arm 190 and is biased against the top surface of the shear block 210 by a coil spring 216 for holding the extreme tip of a test specimen securely in place during the lowering of the cutting edge 204.

The measuring assembly 18 comprises a low powered microscope 218 having a front lens 220 upon which a micro scale 222 has been engraved. The microscope 218 is carried on a two-way micrometer stage mechanism 224 which includes a base portion 226 which is bolted or otherwise secured to the bar 20 and is provided with a dove-tailed groove 228 for a transverse slide 230. This slide is attached to the groove by means of a conventional screw mechanism (not shown) which is operated by the knurled knob 232. The transverse slide 230 and the base portion 226 may be provided with a vernier type scale (not shown) for the accurate determination of the displacement of the microscope in its transverse direction with respect to the bar 20 whenever such is desirable.

The transverse slide 230 has mounted thereon by means of a screw 236 a vertical mounting plate 237 which is provided with a longitudinal extending slot (not shown) for receiving a mounting block 238 that carries the microscope 218. A conventional screw mechanism operated by the knurled knob 239 constitutes the operating means by which the block 238 and thus the microscope 218 is raised and lowered in respect to the bar 20. Again, for purposes of accurately determining the exact position of the microscope in a vertical plane with respect to the bar 20, a vernier type scale (not shown) may be provided on the adjacent faces of the plate 237 and the block 238. A knurled knob 240 is also provided for focusing the microscope 218 in a conventional manner well known in the microscope field.

The operation of the testing testing instrument 10 of the present invention may be explained in substantially the following manner:

The base 12 is first levelled by adjusting the levelling legs 37 thus placing the complete instrument 10 in a level condition. A vacuum pumping system (not shown) is connected to the extension 178 and placed in operation so that the channel 174 is partially evacuated. A test specimen 242 such as, for example, a strip of metal taken from a "lot" of material which is to be used in forming hairsprings for wrist watches is now placed over the elongated passage 186 with the length of the specimen being such that its ends extend over the edges of the block 172. The test specimen is thus held in a flat position on the face of the plates 180 and 182 by the vacuum existing within the channel 174.

With the test specimen held on the face of the plates 180 and 182 by the vacuum existing within the channel 174, the knob 114 on the rotataing and clamping assembly 14 is pushed forward thereby permitting the jaws 88 and 90 to spread apart. The assembly 14 is now moved forward by rotating the knob 58 until the jaw 90 engages against the end of the L shaped plate 180–182 engages against the end of the L shaped plate 180 and 182 as seen in FIGURE 1. With the assembly 14 locked in place against the assembly 16 by moving the handle 162, the knob 114 is now pulled in an outward direction thereby causing the jaws to come together and clamp the end of the test specimen. This relatively light clamping force produced by the jaws being actuated by the operator pulling the knob 114 is ample to clamp the extremely light, thin and often fragile test specimens and, in fact, is highly desirable in most instances since it prevents the clamped end of the test specimen from being crushed as might occur if other types of clamping arrangements were utilized.

With one end of a test specimen now clamped in the jaws 88 and 90 of the vise, the other end is ready to be cut thereby producing a test specimen of an exact known length. To accomplish this cutting, the clamping block 212 of the cutting device 188 is placed over the extended end of the specimen for holding it in place. Pressure is now applied to the top of the support arm 190 as by the operator pressing down with his thumb thereby causing the cutting edge 204 to move down and cut that portion of the test specimen extending over the shear block 210.

With the test specimen cut to an exact length, the holding and cutting assembly is slid to the right as seen in FIGURE 2, thereby allowing the free end of the specimen 242 to be subjected to the pull of gravity which causes it to bend or deflect in the manner shown. As will be readily apparent, different sizes and/or types of materials will be bent to a greater or less degree when placed in this "cantilever" position thus directly indicating their bending strength.

In order to accurately read the amount each test specimen is bent the microscope 218 is adjusted until the micro scale or cross-hairs 222 are exactly centered on the end of the specimen as seen in FIGURE 2. The varioius vernier readings of the positioned microscope are now made and compared to those produced by a known "standard" material thus indicating the bending-strength of the specimen 242.

In cases where the test specimen may be subject to a bending "set" or distortion it is highly desirable to rotate the specimen 242 by 180° so that an average reading can be obtained. This is particularly true in the case of hairspring material which normally comes coiled upon a drum or bobbin and is thus subjected to some presetting force. To accomplish this 180° rotation of the test specimen 242 without releasing its gripped end from the jaws 88 and 90, it is only necessary to pull the knob 142 to the left thereby disengaging the pin 132 from the aperture 128. The disc 122 is now rotated 180° until the aperture 126 is caught and held by the pin 132 thereby causing the shaft 92 and thus the jaws 88 and 90 to be rotated 180°. A second reading is now taken and recorded so that the average bending-strength of the specimen under test can be obtained. Obviously, more apertures could be provided in the disc 122 thereby permitting the test specimen 242 to be subjected to a bending test in various other positions such as, for example, every 90° apart.

From the foregoing, it will be readily apparent that the present invention permits the extremely easy yet highly accurate measurement of thin, flexible materials. The fact that no delicate weighing or scale arrangements are used permits the test instrument to be made portable for transporting from place to place without fear of damage occuring as has heretofore been the case. Since relatively few moving parts are employed in the present test instrument, these parts are interchangeable thus speeding repairs or replacement of the instrument. Also, the use of a vacuum arrangement to hold the article while it is properly clamped and cut is also extremely important since this reduces the handling and holding problem heretofore involved during the positioning and shaping of extremely small, flexible articles. The fact that the specimen being tested can be subjected to several bending tests by simply rotating the vise without removing the specimen adds to the speed and accuracy of the test results. The use of a microscope for ascertaining the exact strength of the specimen insures a higher degree of accuracy than can be obtained by any other known like instrument, yet is not susceptible to changes in temperature, weather or jarring forces that have heretofore hindered other instruments. The microscope is thus not susceptible to the calibration problems that have heretofore limited the use of like instruments.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for measuring the stiffness of an attenuated body of predetermined length comprising base means, clamping means mounted on said base means for clamping one end of said body thereby holding said body in a cantilever position, deflection measuring means mounted on said base means for measuring the deflection of the other end of said body, and means connected with said clamping means for rotating said attenuated body about its longitudinal axis whereby the deflection of the other end thereof can be measured in a second direction.

2. Apparatus for measuring the stiffness of an attenuated body comprising base means, slidable holding means mounted on said base means for holding said attenuated body clamping means mounted on said base means for clamping one end of said attenuated body, means for sliding said holding means along said base means thereby leaving said attenuated body in a cantilever position, means adjacent said body for determining the deflection of the other end of said attenuated body produced by the pull of gravity and means connected with said clamping means for rotating said attenuated body about its longitudinal axis whereby the average deflection of the other end of said attenuated body is determined.

3. Apparatus for measuring the stiffness of an attenuated body comprising base means, slidable holding means mounted on said base means for holding said attenuated body, clamping means slidably mounted on said base means for engaging and clamping one end of said attenuated body, said clamping means being rotatable for rotating said attenuated body about its longitudinal axis, locking means attached to said slidable clamping means for locking said clamping means against movement along said base means, means for sliding said holding means along said base means thereby leaving said attenuated body in a cantilever position, and means for determining the deflection of the other end of said attenuated body produced by the pull of gravity.

4. Apparatus according to claim 3 wherein said holding means is if of the vacuum type.

5. Apparatus according to claim 3 wherein said base means is provided with means for leveling said apparatus.

6. Apparatus for measuring the stiffness of an attenuated body comprising a base, said base consisting of an elongated bar having ridge means along its top surface, leveling leg means mounted on the bottom surface of said bar for leveling said base, slidable holding means mounted on said ridge means for holding said attenuated body, clamping means slidably mounted on said ridge means for engaging and clamping one end of said attenuated body, said clamping means being rotatable for rotating said attenuated body about its longitudinal axis, locking means attached to said slidable clamping means for locking said clamping means against movement along said ridge means, means for sliding said holding means along said ridge means and away from said clamping means thereby leaving said attenuated body in a cantilever position, and means for determining the deflection of the other end of said attenuated body produced by the pull of gravity.

7. Apparatus according to claim 6 wherein said holding means comprises a mounting block having groove means formed on its bottom surface for slidably gripping said ridge means, a vacuum channel formed in the top surface of said block, a passage connected to said channel for connecting said channel to a vacuum pumping system, and plate means positioned over said channel and spaced slightly apart for forming a passage between said plates, said attenuated body being held along said passage by a vacuum existing in said channel.

8. Apparatus according to claim 7 wherein cutting means is mounted on said mounting block for cutting said attenuated body to a predetermined length, said cutting means comprising a cutter blade, and spring biased slidable mounting means for holding said cutter blade a predetermined distance above a shear block mounted on the top surface of said mounting block, downward movement of said mounting means acting to drive said cutter blade into cutting engagement with that portion of the other end of said attenuated body extending over said shear block whereby said attenuated body is cut to a predetermined length.

9. Apparatus for measuring the stiffness of an attenuated body comprising a base, said base consisting of an elongated bar having ridge means along its top surface, leveling leg means mounted on the bottom surface of said bar for leveling said base, slidable holding means comprising a mounting block having groove means formed on its bottom surface for slidably gripping said ridge means, a vacuum channel formed in the top surface of said block, a passage connected to said channel for connecting said channel to a vacuum pumping system, and plates positioned over said channel and spaced slightly apart for forming a passage between said plates, said attenuated body being held along said passage by a vacuum existing in said channel, cutting means mounted on said block for cutting one end of said attenuated body to a predetermined length, said cutting means comprising a cutter blade, spring biased slidable mounting means for holding said cutter blade a predetermined distance above a shear block mounted on the top surface of said mounting block, downward movement of said mounting means acting to drive said cutter blade into cutting engagement with that portion of the end of said attenuated body extending over said shear block whereby said end of said attenuated body is cut to a predetermined length, slidable clamping means for engaging and clamping the other end of said attenuated body, said clamping means comprising a base plate having groove means formed on its bottom surface for slidably gripping said ridge means, a pedestal formed on the top surface of said base plate, an aperture through said pedestal, first and second vise means slidably and rotatably mounted in said aperture, said first and second vise means operating to clamp the other end of said attenuated body when slidably moved in a first direction and operating to release said other end when slidably moved in a second direction, and means connected to said first and second vise means for rotating said vise means by a predetermined amount whereby said attenuated body can be rotated about its longitudinal axis, locking means mounted on said clamping means for locking said clamping means against movement along said ridge means, means for sliding said holding means along said ridge means and away from said clamping means thereby leaving said attenuated body in a cantilever position, and means for determining the deflection of the other end of said attenuated body produced by the pull of gravity.

10. Apparatus according to claim 9 wherein said means for determining the deflection of the other end of said attenuated body comprises a microscope, said microscope being movable in a horizontal and in a vertical plane with respect to said base for centering said microscope on the other end of said attenuated body.

11. A method for mechanically testing the stiffness of a material which consists of cutting said material to a predetermined length, clamping one end of said material in a vise so that the other end of said material is in a cantilever position, determining the initial position of the other end of said material; rotating said material about its longitudinal axis to a plurality of positions, and measuring the deflection of said other end produced by the pull of gravity.

12. A method for mechanically testing the stiffness of an attenuated body which consists of cutting said body to a predetermined length, clamping one end of said body in a rotatable vise so that the other end of said body is in a cantilever position, measuring the deflection of said other end produced by the pull of gravity, rotating said body about its longitudinal axis by rotating said vise, and again measuring the deflection of said other end produced by the pull of gravity whereby the average stiffness of said body is obtained.

References Cited by the Examiner

UNITED STATES PATENTS

| 73,233 | 1/1868 | Clifford | 73—66 |
| 2,577,805 | 12/1951 | Pidduck | 73—161 |
| 2,860,510 | 11/1958 | Press | 73—100 X |

RICHARD C. QUEISSER, *Primary Examiner.*

JOSEPH P. STRIZAK, *Examiner.*